(12) United States Patent
Chuang

(10) Patent No.: US 9,383,584 B2
(45) Date of Patent: Jul. 5, 2016

(54) VIDEO PLAYING SYSTEM

(71) Applicant: HON HAI PRECISION INDUSTRY CO., LTD., New Taipei (TW)

(72) Inventor: Tsung-Jen Chuang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 136 days.

(21) Appl. No.: 14/141,484

(22) Filed: Dec. 27, 2013

(65) Prior Publication Data

US 2014/0198262 A1 Jul. 17, 2014

(30) Foreign Application Priority Data

Jan. 17, 2013 (TW) .............................. 102101834 U

(51) Int. Cl.
*G02B 27/01* (2006.01)
*G03B 21/14* (2006.01)

(52) U.S. Cl.
CPC .......... *G02B 27/0176* (2013.01); *G03B 21/145* (2013.01); *G02B 2027/0152* (2013.01); *G03B 21/147* (2013.01)

(58) Field of Classification Search
CPC . H04N 9/3141; H04N 9/3185; G03B 21/145; G03B 21/147
USPC ................ 353/30, 70, 99, 119; 359/630, 639; 2/6.2, 6.3
See application file for complete search history.

(56) References Cited

U.S. PATENT DOCUMENTS

| | | | | |
|---|---|---|---|---|
| 4,181,405 A * | 1/1980 | Cohen | ............................ | 349/11 |
| 5,467,154 A * | 11/1995 | Gale et al. | ..................... | 353/119 |
| 6,249,386 B1 * | 6/2001 | Yona et al. | .................... | 359/630 |
| 2007/0000031 A1 * | 1/2007 | Makris et al. | ..................... | 2/411 |
| 2007/0064311 A1 * | 3/2007 | Park | ............................. | 359/630 |
| 2010/0302356 A1 * | 12/2010 | Sinivaara | ........................ | 348/61 |
| 2011/0055993 A1 * | 3/2011 | Baudou | ................. | A42B 3/042 2/6.2 |

* cited by examiner

*Primary Examiner* — Sultan Chowdhury
(74) *Attorney, Agent, or Firm* — ScienBiziP, P.C.

(57) ABSTRACT

A video playing system includes a support, a screen mask, and a projecting device set on the support. The support includes a pair of rotating fasteners correspondingly set at two opposite sides of the support. The screen mask is rotatably connected to the rotating fasteners and covers a part of the support. The screen mask includes a inner projecting surface. The projecting device projects video onto the inner projecting surface.

20 Claims, 3 Drawing Sheets

VIDEO PLAYING SYSTEM

TECHNICAL FIELD

The disclosure generally relates to entertainment equipment, and particularly to a video playing system.

DESCRIPTION OF RELATED ART

Head-mounted video playing systems are often designed as a pair of glasses. The head-mounted video playing system includes two liquid crystal panels correspondingly placed before a pair of eyes to display video. However, because the liquid crystal panels are relatively heavy, most of the weight of the head-mounted video playing system is borne by a nose of a user, which may be uncomfortable. In addition, the liquid crystal panels are close to eyes of the user, which strains the eyes easily.

Therefore, it is desirable to provide a means to overcome the above-mentioned problems.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
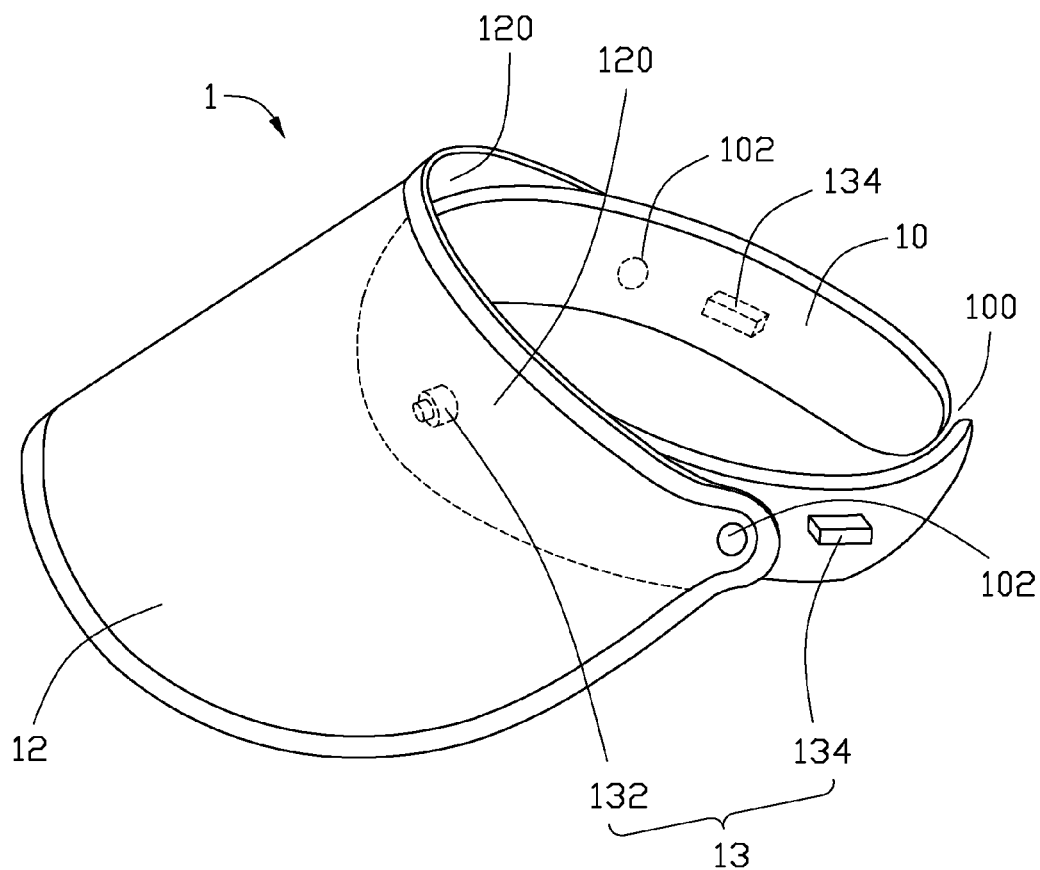
FIG. 1 is an isometric view of a first embodiment of a video playing system.

FIG. 1 shows that a first embodiment of a video playing system 1 includes a support 10, a screen mask 12, and a projecting device 13. The support 10 includes a pair of rotating fasteners 102. Each rotating fastener 102 is set in a corresponding side of the support 10. The screen mask 12 is rotatably connected to the rotating fasteners 102 and covers a part of the support 10. The screen mask 12 includes an inner projecting surface 120. The projecting device 13 is set on the support 10 and projects video onto the inner projecting surface 120.

The support 10 is configured to fasten the video playing system 1 to a body of a user. In one embodiment, the support 10 fastens the video playing system 1 to a head of a user. The support 10 can be, but is not limited to, a helmet, a cap, or other equipment capable of being fastened to the head of the user. In one embodiment, the support 10 is a head band made of resilient material. The support 10 is substantially a circular ring defining an opening 100 in a back portion thereof. The support 10 is deformed to wrap around and grasp a periphery of the head of the user.

A portion of the screen mask 12 conforms to a periphery of the support 10. In one embodiment, a length of the screen mask 12 is about 40 centimeters (cm), and a width of the screen mask 12 is about 30 cm.

The projecting device 13 includes at least one projector 132 and at least one power module 134. In the illustrated embodiment, there are two power modules 134 and one projector 132. The projector 132 is set on a front surface 103 of the support 10. The power modules 134 provide power to the projector 132.

Figure 2:
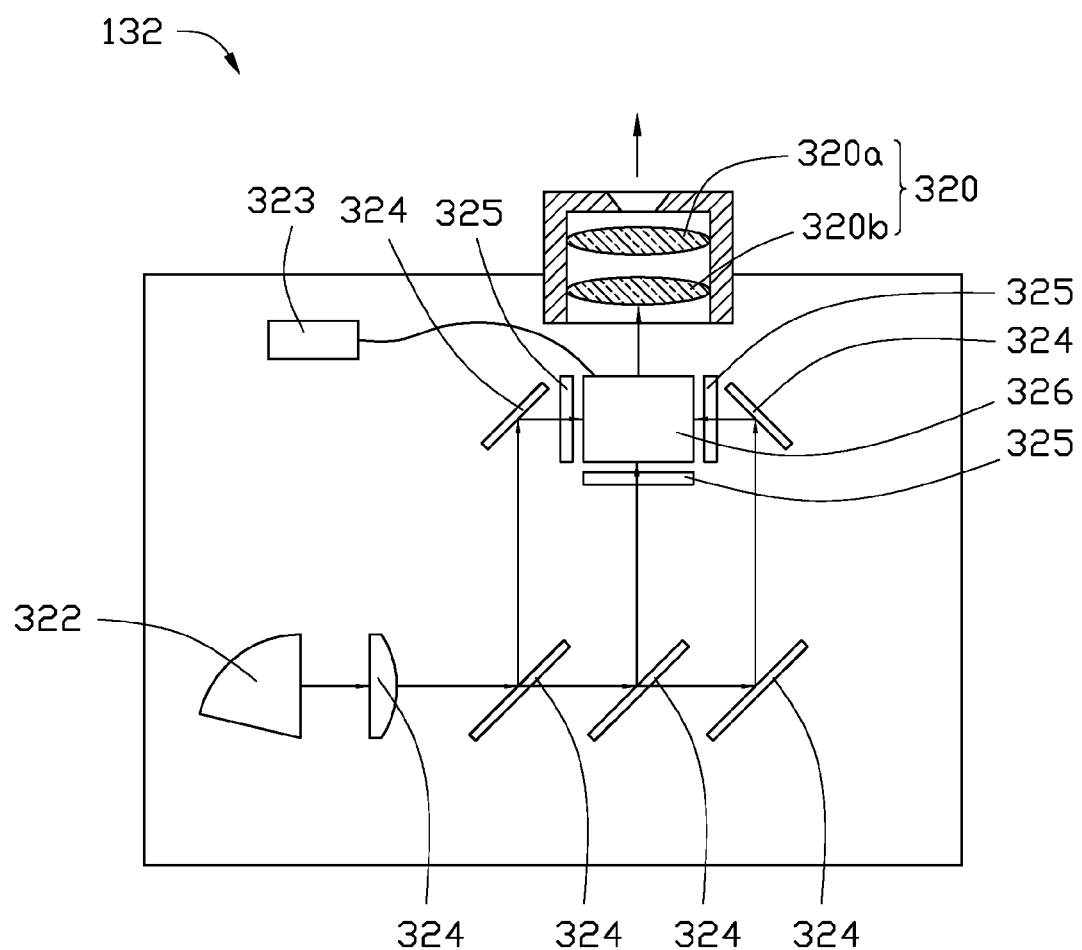
FIG. 2 is a schematic view of an interior of a projector of FIG. 1.

FIG. 2 shows that the projector 132 includes a lens group 320, a light source 322, and a storage 323, a plurality of mirrors 324, a plurality of optics lens 325, and a LCD display 326. The mirrors 324 and the optics lens 325 cooperate with each other for guiding lights emitted by the light source 322 into the LCD display 326. The LCD display 326 displays video data stored in the storage 323. In the illustrated embodiment, the projector 132 is located at a central portion of the front surface 103 between the pair of rotating fasteners 102. The lens group 320 includes a short focus lens 320a to project video a short distance onto the inner projecting surface 120, and an offset focus lens 320b to project the video along a direction deviating from a principle optical axis of the lens group 320. The storage 323 stores video data. In other embodiments, the projector 132 includes a wireless receiver and receives the video data via a wireless network.

Figure 3:
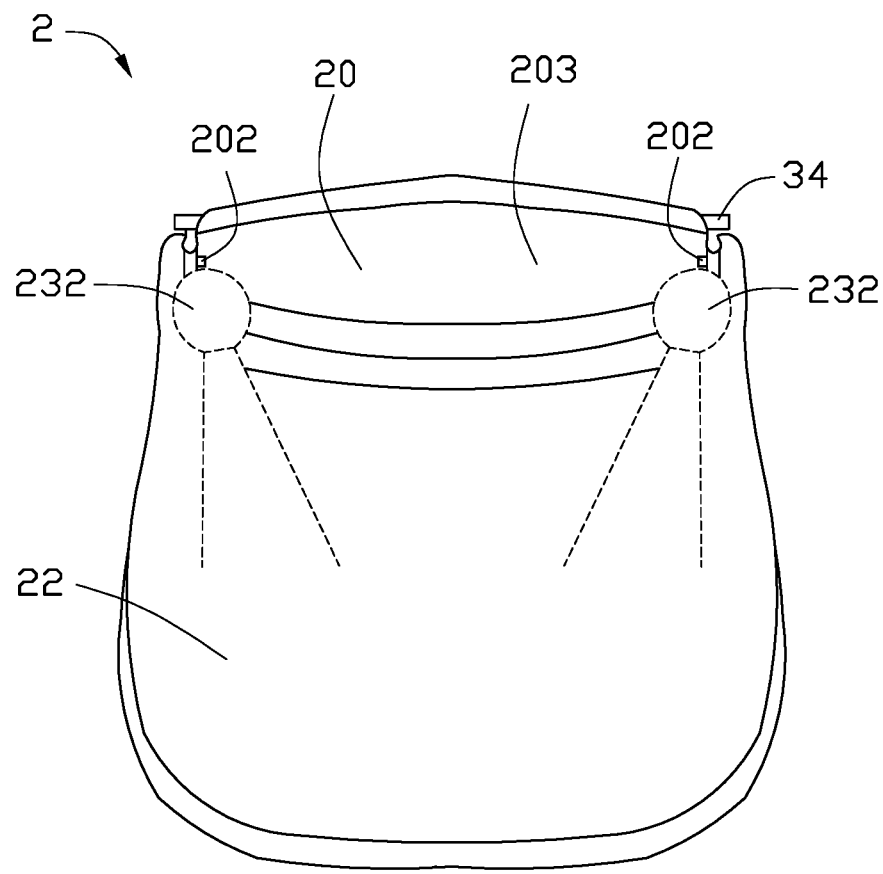
FIG. 3 is an isometric view of a second embodiment of a video playing system.

FIG. 3 shows a second embodiment of a video playing system 2, which is similar to the video playing system 1 of the first embodiment, except that the projecting device 13 of the video playing system 2 includes two projectors 232. In the illustrated embodiment, the projectors 232 are located between the pair of rotating fasteners 202 and symmetrical about a central portion of the front surface 203 of the support 20. Thus, weight of the projectors 232 is balanced.

The video playing system 1 conveniently fastens the projecting device 13 on the head of the user. In addition, the inner projecting surface 120 is far enough from the eyes to prevent strain on the eyes from watching the projected videosinner projecting surface.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments.

What is claimed is:

1. A video playing system, comprising:
    a support comprising a pair of rotating fasteners correspondingly set at two opposite sides of the support;
    a screen mask rotatably connected to the rotating fasteners and covering a part of the support; and
    a projecting device set on the support;
    wherein the screen mask comprises an inner projecting surface facing the support, and the projector directly projects video on the inner projecting surface; the projecting device facing the screen mask is located between the screen mask and the rotating fastener.

2. The video playing system of claim 1, wherein the support is a head band made of elastic material.

3. The video playing system of claim 1, wherein the support is selected from the group consisting of a helmet and a cap.

4. The video playing system of claim 1, wherein the screen mask is bent along a periphery of the support.

5. The video playing system of claim 4, wherein a length of the screen mask is 40 centimeters and a width of the screen mask is 30 centimeters.

6. The video playing system of claim 1, wherein the projecting device comprises at least one projector and at least one power module provided power to the projector, the projector is set on a front surface of the support facing the screen mask and located at a center between the pair of the rotating fasteners.

7. The video playing system of claim 6, wherein there are two power modules, the power modules are symmetrically set at two opposite sides of the support corresponding to a pair of ears of the user.

8. The video playing system of claim 6, wherein the projector comprises a lens group, a light source, and a storage configured to stores the video data needs to be projected.

9. The video playing system of claim 8, wherein the lens group comprises a short focus lens to project the video in a short distance.

10. The video playing system of claim 8, wherein the lens group comprises a offset focus lens to project the video along a direction deviating from a principle optical axis of the lens group.

11. The video playing system of claim 1, wherein the screen mask covers the projecting device.

12. A video playing system comprising:
a support having two opposite sides and comprising a pair of rotating fasteners correspondingly set at the two opposite sides;
a projecting device set on the support;
a screen mask rotatably connected to the rotating fasteners and configured to cover the projecting device; and
wherein the screen mask comprises an inner projecting surface facing the support, and the projector projects video on the inner projecting surface.

13. The video playing system of claim 12, wherein the projecting device is located between the screen mask and the rotating fastener.

14. The video playing system of claim 13, wherein the projecting device comprises at least one projector and at least one power module provided power to the projector, the projector is located on a surface of the projecting device facing the screen mask, and further located between the pair of the rotating fasteners.

15. The video playing system of claim 14, wherein the at least one power module located on the support is adjacent to one of the rotating fatteners.

16. The video playing system of claim 14, wherein the projector comprises a lens group, a light source, and a storage configured to stores the video data needs to be projected.

17. The video playing system of claim 16, wherein the lens group comprises a offset focus lens to project the video along a direction deviating from a principle optical axis of the lens group.

18. The video playing system of claim 12, wherein the projecting device comprises two projectors and two power modules provided power to the corresponding projector, the projectors is located adjacent to the corresponding rotating fasteners.

19. The video playing system of claim 18, wherein the power module provides power to the corresponding projector, the power module is located on the support.

20. The video playing system of claim 12, wherein the screen mask is bent along a periphery of the support.

* * * * *